United States Patent [19]

Storey, Jr.

[11] Patent Number: 4,771,290

[45] Date of Patent: Sep. 13, 1988

[54] RANGE MEASUREMENT METHOD AND APPARATUS HAVING SCANNING INTERFEROMETERS AND RANGE SIGNAL PROCESSOR

[75] Inventor: Moorfield Storey, Jr., Seattle, Wash.

[73] Assignee: The Boeing Company, Seattle, Wash.

[21] Appl. No.: 655,945

[22] Filed: Sep. 28, 1984

[51] Int. Cl.$^4$ .......................... G01S 3/02; G01S 5/02; G01C 21/00

[52] U.S. Cl. .................................. 342/458; 342/424; 364/458

[58] Field of Search ............... 343/423, 424, 428, 430, 343/445, 451, 458; 364/458; 235/411, 415

[56] References Cited

U.S. PATENT DOCUMENTS

| | | |
|---|---|---|
| 3,005,200 | 10/1961 | O'Meara . |
| 3,036,210 | 5/1962 | Lehan et al. . |
| 3,134,896 | 5/1964 | Briggs . |
| 3,238,527 | 3/1966 | Vogt . |
| 3,242,430 | 3/1966 | Ghose . |
| 3,303,503 | 2/1967 | Stabilito . |
| 3,329,955 | 7/1967 | Beukers et al. . |
| 3,719,948 | 3/1973 | Mueller . |
| 3,801,983 | 4/1974 | Woolley . |
| 3,842,419 | 10/1974 | Arndt . |
| 3,935,574 | 1/1976 | Pentheroudakis . |
| 3,971,027 | 7/1976 | Alcock et al. . |
| 4,136,342 | 1/1979 | Alcock et al. . |
| 4,170,774 | 10/1979 | Schaefer . |
| 4,339,755 | 7/1982 | Wright . |

Primary Examiner—Theodore M. Blum
Assistant Examiner—Gregory C. Issing
Attorney, Agent, or Firm—Christensen, O'Connor, Johnson & Kindness

[57] ABSTRACT

An array of antenna elements is arranged along a common, rotating platform so as to form a pair of mechanically scanned interferometers exhibiting spaced, parallel receiving axes for ranging on a distance emitter. As the receiving lobes of the pair of interferometers scan across the emitter, lobe modulated signals are received having a relative time difference $t_{21}$ that varies as a sinusoidal function of time due to the platform's rotation and includes a dc error value due to slight but unavoidable nonparallelism of the interferometer beams. The rate of change of $t_{21}$ is derived to produce a signal $\dot{t}_{21}$ which drops the dc error component of $t_{21}$, and which is applied as an input to a rate dependent range signal processor producing an output signal of range R as a function of the relationship $$\frac{-d\sin\phi}{\dot{t}_{21}}.$$

In this relationship d is the separation of the interferometer centers along the base line, and $\phi$ is the varying angle of arrival of the emitter relative to the rotating base line of the antenna array. In a preferred embodiment, the individual antenna elements that form the pair of interferometers, are mounted and servo controlled on the rotating platform so as to maintain tracking alignment of the principal antenna beams on an emitter of interest, independently of the rotating platform so as to optimize received signal strength.

11 Claims, 4 Drawing Sheets

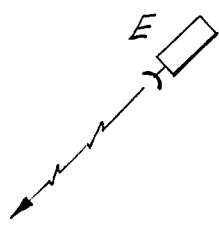
*Fig. 2.*
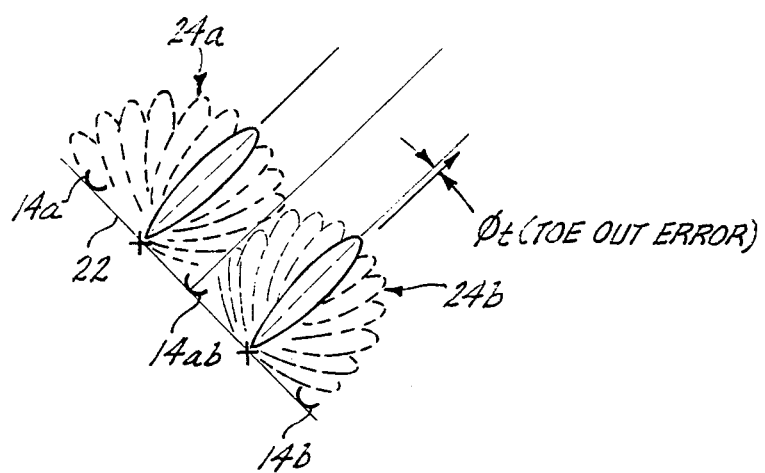
*Fig. 4.*
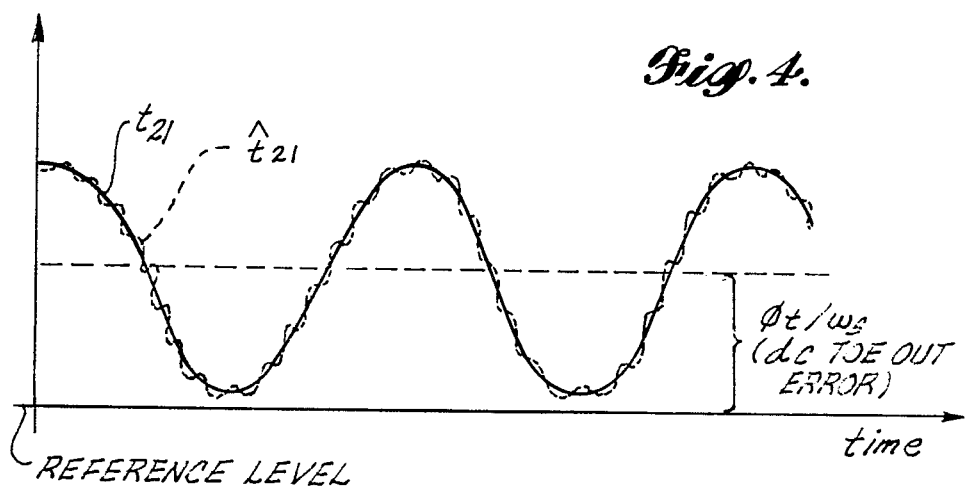

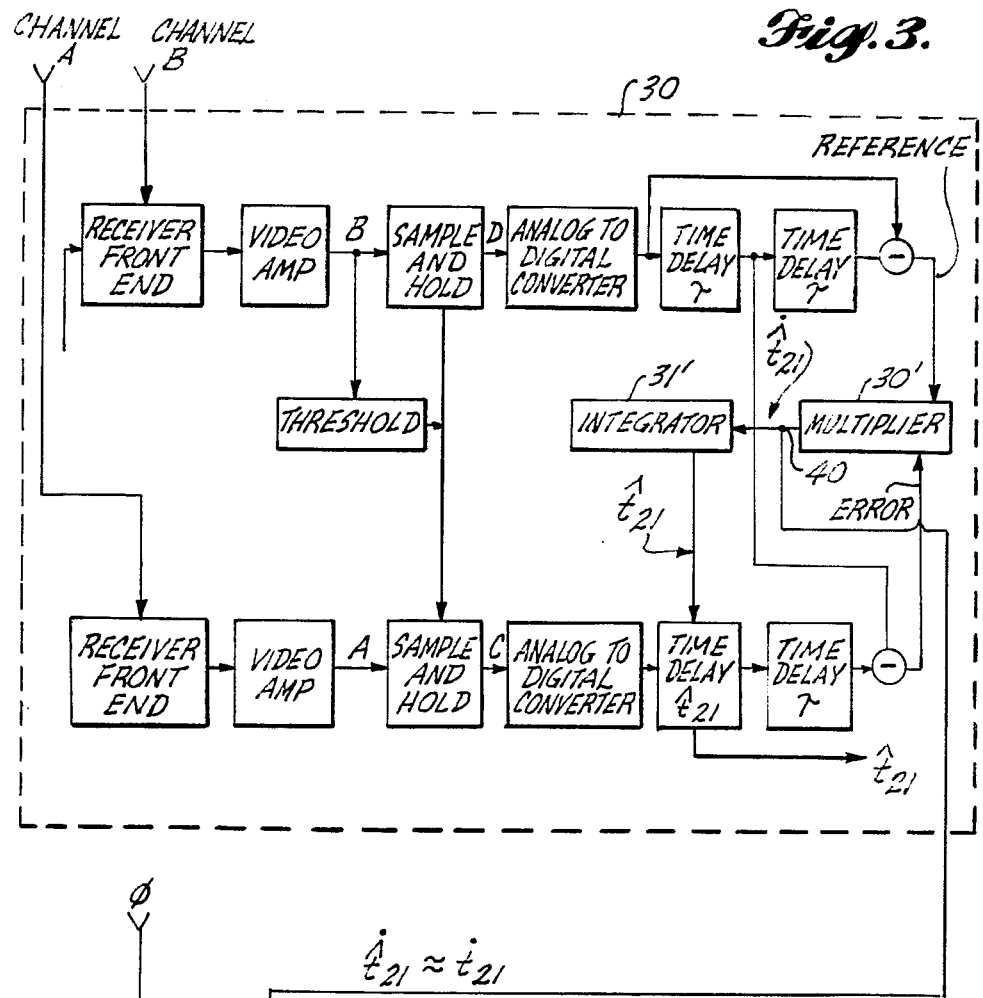
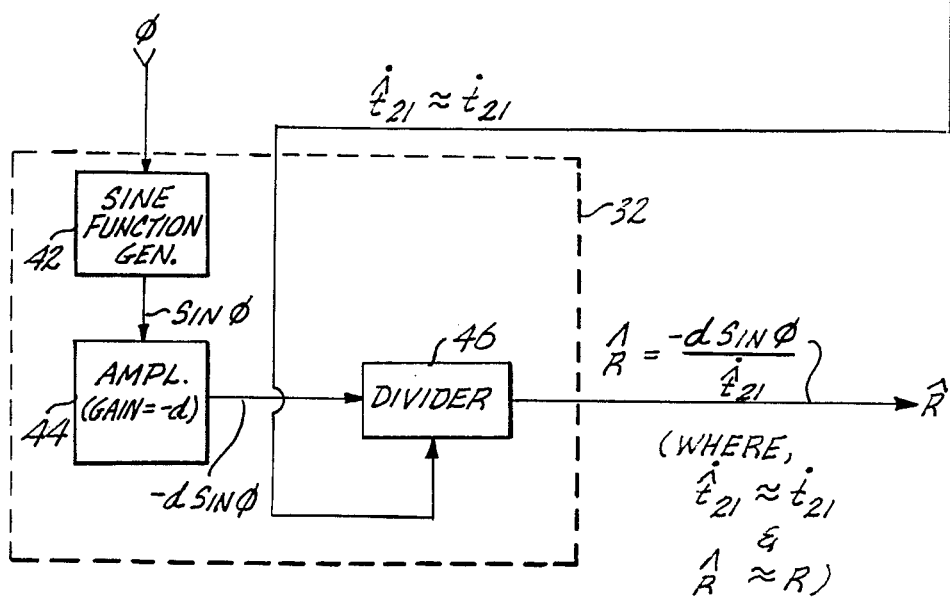
Fig. 3.

RANGE MEASUREMENT METHOD AND APPARATUS HAVING SCANNING INTERFEROMETERS AND RANGE SIGNAL PROCESSOR

BACKGROUND OF THE INVENTION

This invention pertains to passive-type range determining systems for measuring the distance (i.e., range) to a source of electromagnetic radiation.

There is often a need, especially in navigational and surveillance operations, to have an effective means for measuring distance to a particular source of electromagnetic radiation, such as radio frequency signals emitted by a radar transmitting antenna. In some situations, the emitter itself may be of a scanning type in which the electromagnetic energy sweeps across the station at which the range measurement is performed. In such case, equipment may be used of the type disclosed in U.S. Pat. No. 4,316,193 issued Feb. 16, 1982, to Philip Jones and myself, and assigned to The Boeing Company of Seattle, Wash. Disclosed in that patent is a system for finding the range to the emitter by measuring a very small time difference signal called $t_{21}$, representing the difference in time between the arrival of the scanning emitter at the first, and then at the second of a pair of spaced apart receiving antenna elements, and then producing a signal for range as a function of the time difference $t_{21}$.

In other measuring situations, the emitter may be nonscanning such that it is received at the measuring station as a more or less nonmoving stream of radiation. For that case, a related type of ranging equipment may be used as disclosed in U.S. Pat. No. 4,339,755 issued on July 13, 1982, to James M. Wright, and assigned to The Boeing Company. As described in the last mentioned patent, the nonscanning emitter is monitored by a pair of synchronously scanning antennas located at spaced points on the monitoring station with the receiving axes of the scanning antenna elements maintained parallel. At time difference $t_{21}$ in the received signals developed by the parallel scanning antennas is processed and used to derive the range measurement. The equipment and technique for this purpose is sometimes called passive ranging on nonscanning emitters or PRONSE.

While the foregoing systems have proven merit, it is desirable to enhance the accuracy of the range measurement and the present invention concerns an improvement to PRONSE systems. One constraint on the accuracy of PRONSE equipment is an unavoidable misalignment of the receiving axes of the antenna beams due, for example, to bending or warping of the platform on which the antenna elements are mounted. Since it is often necessary to measure range to an emitter that is many orders of magnitude greater than the separation of the antenna elements along the base line, any misalignment in the phase relationship of the ideally parallel antenna beams will produce a significant error. Inaccuracy in the range measurement due to this cause is sometimes called a "toe-out" error signifying that one of the antenna beams exhibits toe out relative to the other beam. The platform on which the antennas are mounted is typically on the order of 10 meters or more wide in order to maximize the separation of the antenna elements. With a platform of this magnitude it will unavoidably exhibit mechanical bending or flexure which results in a toe-out error.

Since the measured range of $$R = \frac{d\cos\phi}{t_{21}\omega_s}$$

is based on the ability of the PRONSE system to extract an angle $\theta$ subtended at the source by the two antennas spaced apart by distance d and scanning at $\omega_s$, it will be observed that $\theta$ becomes very small when ranging on emitters that are located hundreds of kilometers from the measurement platform. For example, for d=10 meters and R=100 kilometers and $\theta=0$ (i.e., broadside to the antenna array), then the subtended angle $\theta$ is equal to 10 meters divided by 100 kilometers or 100 microradians. For such very small angles of $\theta$, the requirement of beam parallelism of the antennas is very demanding. In this example, for instance, a 10 microradian uncompensated departure (toe out) from parallelism of the antenna axes, would result in a 10% error in measured $\theta$ and, thus, a 10% error in the output signal representing range.

SUMMARY OF THE INVENTION

To improve the accuracy of range measurement, the invention provides a pair of side-by-side interferometers arrayed along a base line which, in turn, is mounted on a common platform that is rotated as a unit so that the interferometer receiving lobes are mechanically scanned across the position of the distant emitter. As the sets of interference lobes associated with the side-by-side interferometers are scanned across the position of the emitter with platform rotation, each interferometer produces a signal representing the received emitter modulated by the interference lobes. These signals, when compared, exhibit the relative time difference $t_{21}$ mentioned above in the background which may be processed for range R. A modified signal processing is employed in combination with the rotating interferometers in which the rate of change of the time difference $t_{21}$ is measured and from that, a range signal is produced which is independent of toe-out error. The range signal is produced by a signal processor that receives signal variables $\phi$, representing a continuously changing angle of arrival $\phi$ as the base line of the interferometers rotates relative to the emitter, and a rate of change of the time difference or $\dot{t}_{21}$ wherein the processed range $$R = \frac{-d\sin\phi}{\dot{t}_{21}}.$$

In a preferred embodiment of this PRONSE system, the individual antenna elements that form the interferometers are mounted for independent rotation on the rotating platform and these elements are independently servo controlled in angular position to track an emitter of interest. Thus, the antenna elements are maintained at an orientation pointed substantially toward the vicinity of a particular emitter while holding the antenna beams parallel, and while the platform continues to rotate. The received signal strength from this operation is significantly enhanced without disruption of the interferometer lobes which develop the range determining time difference signal $t_{21}$ and the rate of change $\dot{t}_{21}$ of such time difference.

To provide a complete disclosure of the invention, reference is made to the appended drawings and following description of a particular and preferred embodiment.

BRIEF DESCRIPTION OF THE DRAWINGS

FIG. 2 is a diagrammatic, plan view of the orientation of the antenna and interferometer receiving axes which are ideally parallel, but inevitably exhibit a nonparallelism error as indicated;

FIG. 3 is a block diagram of the rate of change range signal processing circuitry;

FIG. 4 is a wave form diagram illustrating the time varying quantities $t_{21}$ and $\dot{t}_{21}$ as well as the toe-out error $\phi_t/\omega_s$;

DETAILED DESCRIPTION

Figure 1:
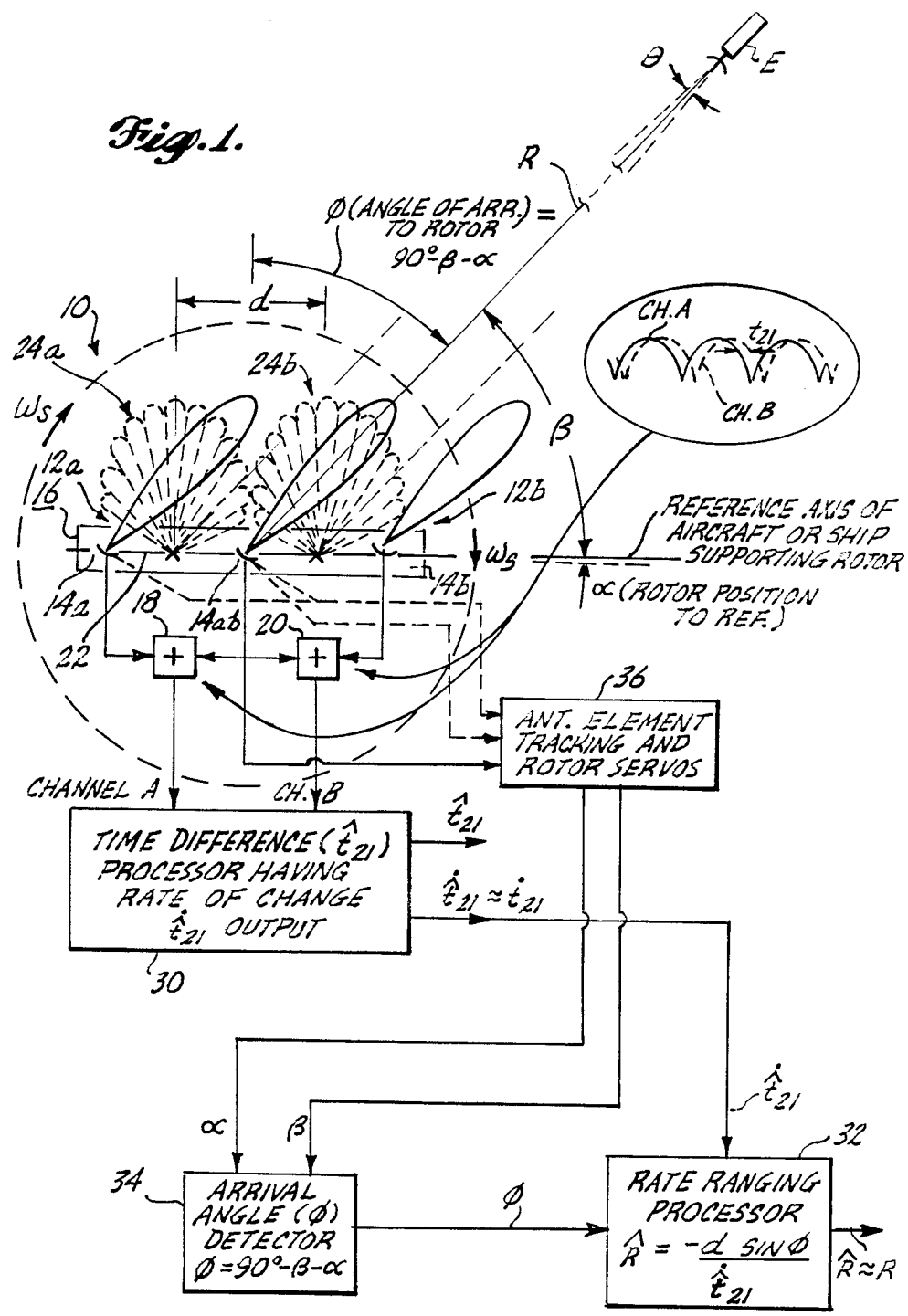
FIG. 1 is a diagrammatic and block diagram of the range determining system in accordance with the preferred embodiment of the invention and shows the geometrical relationship between the rotating interferometers ranging on a distant emitter.

With reference to FIG. 1, the range measurement system in accordance with the invention is embodied in an apparatus 10 suitable for being carried by an aircraft or ship as a mobile monitoring station for determining the range R to a distant emitter E. For this purpose, apparatus 10 includes a pair of radio frequency interferometers 12a and 12b formed by a plurality of antenna elements 14a, 14ab and 14b arrayed on a common, rigid rotating platform or rotor 16 that is, in turn, rotatably supported on the mobile monitoring station (aircraft or ship). The output signals from the set of three antenna elements are additively combined by adders 18 and 20 to form a first interferometer from the received signals from elements 14a and 14ab which has an output from adder 18 designated channel A, and to form a second interferometer made up of antenna elements 14b and 14ab which combine at adder 20 to form an output channel B. The antenna elements are arranged along a base line 22 with element 14ab at the center of the base line and serving as the point of rotation of rotor 16 and with the outboard elements 14a and 14b mounted equidistantly from the center element 14ab. Outboard elements 14a and 14b share center element 14ab to form the interference pattern lobes 24a and 24b of interferometers 12a and 12b. Thus, the center points of the interferometers 12a and 12b are at the indicated midpoints respectively between element 14a and element 14ab and between element 14b and element 14ab with a separation of such midpoints along the base line being equal to d. The separation d of the interferometers subtend the angle $\theta$ at the distant emitter.

The signal processing of apparatus 10 includes a time difference processor 30 receiving the interferometer signals appearing on channels A and B and producing not only a time difference signal $t_{21} \simeq t_{21}$, but also the rate of change of such time difference as represented by $t_{21} \simeq \dot{t}_{21}$. A rate ranging processor 32 of apparatus 10 receives the rate of change $\dot{t}_{21}$ time varying signal from processor 30 along with a signal representing the angle of arrival $\phi$ from an angle of arrival detector 34 and combines these signals in accordance with a relationship of $-d \sin \phi/\dot{t}_{21}$ to produce an output signal of R, which as described more fully hereinafter closely approximates the desired range R and is free of the troublesome toe-out error caused by lack of perfect alignment of the antenna elements on the platform rotor 16.

In this preferred embodiment, the individual antenna elements 14a, 14ab, and 14b are mounted for independent rotation on rotor 16 and are driven by servos 36 which control both the angular rate of rotation $\omega_s$ of the rotor 16 and concurrently keep antenna elements 14ab, 14a and 14b pointed toward the vicinity of the emitter E, as described more fully hereinafter in connection with FIGS. 5a and 5b. Servos 36 also provide in the apparatus 10, output signals representing the angle $\alpha$ at which the base line 22 of the antenna array makes with a reference axis of the aircraft or ship, and a signal representing $\beta$ as the angle that the emitter signal arrives at the monitoring station relative to the reference axis. From these signals of $\alpha$ and $\beta$, detector 34 produces a signal representing the arrival angle $\phi$ of the emitter signal referenced to the revolving base line 22 of the interferometers on rotor 16.

In comparing apparatus 10 of FIG. 1 to known ranging systems such as the type disclosed in U.S. Pat. No. 4,339,755, it will be observed that similarities exist between the geometry of FIG. 1 and the basic ranging relationship disclosed in prior art ranging systems. For example, the system described in U.S. Pat. Nos. 4,339,755 and discussed above, measures range R by using the small angle approximation of $\sin \theta$ approximately equals $\theta$ and the relationships of $\theta = d \cos \phi/R$, and $\theta = t_{21} \omega_s$, to produce a ranging relationship of:

$$R = \frac{d \cos \phi}{t_{21} \omega_s} \quad (1)$$

In using this known ranging relationship to measure R, the distance d separating the sensors is quite limited relative to the range distance R. Typically, the distance d is on the order of 10 meters given the mounting of the antennas on an aircraft or ship platform. With such a system, it is often desired to measure range up to distances of 100 or more kilometers. Thus, for a measurement of an emitter at 100 kilometers and an antenna separation d of 10 meters, and an angle of arrival $\phi = 0$ (i.e., broadside to the antennas), the subtended angle:

$$\theta = \frac{10 \text{ m}}{100 \text{ km}} = 100 \text{ } \mu\text{radians} \quad (2)$$

This relatively miniscule angle $\theta$ subtended by antenna separation d, places a severe requirement on maintaining parallelism of the antenna beams when either the distance R becomes great or the antenna spacing d becomes relatively small. In the example given above, a 10 microradian uncompensated departure from parallelism of the antenna beams will result in a 10% error in the effective angle $\theta$ and, thus, a 10% error in the range output R. The error analysis may be expressed by the following equation:

$$t_{21} = \frac{d \cos \phi}{R \omega_s} + \frac{\theta_t}{\omega_s} \quad (3)$$

where $\phi_t$ is the space angle through which one beam has been rotated out of parallelism (i.e., toed out) with respect to the other beam. Ideally, $\phi_t$ is equal to zero. However, as mentioned above, practical separation distances d of the platform give rise to disturbances of bending and warping of the platform structure such that some toe-out error $\phi_t$ is unavoidable, as depicted in FIG. 2. The magnitude of the nonparallelism $\phi_t$ contributes to the ranging error as a function of the length of time $\phi_t/\omega_s$ that is required for the antenna beam to scan through the toe-out angle $\phi_t$ at the angular velocity $\omega_s$. Prior attempts to compensate for this toe-out error have heretofore proved unsatisfactory for such reasons as the difficulty of measuring in real time, the bending and/or warping of the structural platform and difficulty in steering antenna beams with the required accuracy.

In the apparatus 10 of the invention, by using interferometers as the antenna sensors and arranging such interferometers on a common, rigid platform in the form of rotor 16, a measurement of range R may be produced which is based on a rate of change of the time difference $t_{21}$ which, in turn, is independent of the steady state toe-out error of the antenna beams. The derivation of the rate ranging processing of apparatus 10 is derived in the following manner. First, the incremental change in the time difference $t_{21}$ as a function of the incremental change in the components of such time difference is set forth in the differential equation:

$$dt_{21} = \frac{\delta t_{21}}{\delta \phi} d\phi + \frac{\delta t_{21}}{\delta d} dd + \frac{\delta t_{21}}{\delta R} dR + \frac{\delta t_{21}}{\delta \omega_s} d\omega_s + \frac{\delta t_{21}}{\delta \phi_t} d\phi_t \quad (4)$$

When d, R, $\omega_s$, and $\phi_t$ are constants, then Equation 4 reduces to:

$$dt_{21} = \frac{\delta t_{21}}{\delta \phi} d\phi = \frac{-d\sin \phi}{R\omega_s} d\phi \quad (5)$$

This equation then transforms to:

$$\frac{dt_{21}}{d\phi} = \frac{-d\sin \phi}{R\omega_s} \quad (6)$$

Since, $\omega_s = \frac{d\phi}{dt}$ \quad (7)

then, $R = \frac{-d\sin \phi}{\frac{dt_{21}}{dt}}$ \quad (8)

in which $\frac{dt_{21}}{dt} = \dot{t}_{21}$; such that:

$$R = \frac{-d\sin \phi}{\dot{t}_{21}} \quad (9)$$

The noteworthy feature of this relationship is that the measured R does not depend on the toe-out angle error $\phi_t$, as long as such toe-out is constant over the measurement interval. Since $\phi_t$ only needs to remain constant over a period of observation of the emitter, which typically is measured in mere seconds or minutes, the accuracy of the range output signal of apparatus 10 is substantially uncorrupted by the toe-out misalignment. The output of rate ranging processor 32 is thus superior to systems in which there is an attempt to compensate for the toe-out error by measuring the degree of misalignment of the platform frame and then using the resulting calibration to correct subsequent measurements of range to an emitter of an unknown distance.

Thus, in operation, apparatus 10 of FIG. 1 mechanically scans the side-by-side interferometers 12a and 12b causing the fingers of interference lobes 24a and 24b to traverse across the incoming emissions from emitter E as rotor 16 revolves around the central location of antenna element 14ab at an angular rate of $\omega_s$. At output channels A and B, the interferometer lobes 24a and 24b modulate the intensity of the received emitter signal at slightly different times due to the separation d of the interferometers and the scanning motion of rotor 16 at $\omega_s$. Output channels A and B thus exhibit nearly identical envelope signals slightly delayed by the time difference $t_{21}$, which varies in time (due to the rotation of rotor 16) and reaches a maximum time difference $t_{21}$ (max) when the angle of arrival $\phi$ is zero (i.e., when the broadside 22 of the interferometers on rotor 16 is perpendicular to the direction of arrival of emitter E.

From the signal envelopes on channels A and B, processor 30 operates as described more fully hereinafter to produce a time derivative of the $t_{21}$ time difference in the signals and outputs the corresponding signal $\dot{t}_{21}$. It is this time derivative of the time difference signal which serves as one component of the rate ranging relationship derived above. The rate of change time difference $\dot{t}_{21}$ is a sinusoidally varying quantity and is applied as one input to processor 32 which receives as another input, a time varying value of angle of arrival $\phi$. These two time varying quantities are combined in processor 32 to produce a signal output representing the range R. The signal values shown in the drawings that are designated with hat ( ˆ ) are close approximations to the desired values of $\dot{t}_{21}$ and R in accordance with the functioning of the presently preferred time difference processor 30 as described more fully in connection with FIG. 3.

In apparatus 10, and as more specifically shown in FIG. 3, the rate of change, $\dot{t}_{21}$, of time difference $t_{21}$ is measured by modifying an existing time difference processor of the type disclosed in U.S. Pat. No. 4,316,193. Thus, apparatus 10 includes a time difference processor 30 which, as shown in greater detail in FIG. 3, incorporates a servo loop for producing a time difference signal $\hat{t}_{21}$. In the modified processor 30 of the present invention, the input signals to processor 30 are the relatively time spaced, but otherwise nearly identical, overlapping envelope signals on channels A and B from the side-by-side interferometers resulting from the modulation of the received emitter signal by the interference lobes of the interferometers. The processing of these signals to produce a value of $\hat{t}_{21}$ (as shown in FIG. 3) is essentially the same as described in U.S. Pat. No. 4,316,193 except that the relatively time-shifted signals at the input to the processor are obtained by scanning the interferometers of apparatus 10, on a nonscanning emitter, rather than signals received from a scanning emitter as in the case of the above-mentioned patent. As explained in that patent, the processed time difference $t_{21}$ closely approximates the actual time difference $t_{21}$ existing between the signals.

In processor 30 the time rate of change of $t_{21}$, or $\dot{t}_{21}$ is taken from a junction 40 on the input side of the integrator in the servo loop of the processor. In this preferred embodiment, processor 30 is a digital processor corresponding to the processor of FIG. 4 in the reference patent and, hence, junction 40 exists between digital multiplier 30' and digital integrator 31'. Alternatively, in an analog version of modified processor 30, the junction 40 would exist between the corresponding analog multiplier 30 and analog integrator 30 of the analog processor of FIG. 1 of the referenced patent.

In either case, it will be appreciated that the input to the integrator (integrators 31 and 31' of the referenced patent) is the time rate of change of the value $t_{21}$, and it is this signal $\hat{t}_{21}$ that is produced by processor 30 and fed to the rate ranging processor 32 along with the signal representing the time varying quantity $\phi$. Other than this modification, processor 30 is constructed and operates according to the description in U.S. Pat. No. 4,316,193 and that description is expressly incorporated herein by reference.

Since the signal $t_{21}$ produced in processor 30 closely approximates the actual $t_{21}$ exhibited by the input signals, it follows that $\hat{t}_{21} \approx \dot{t}_{21}$. This is illustrated by the waveforms of FIG. 4 showing a sinusoidally varying $t_{21}$ followed closely by the time difference processor derived $t_{21}$. Since both these quantities are sinusoidal functions, the time derivatives will also be sinusoids and will exhibit essentially the same waveform characteristics although shifted in phase in accordance with the derivative caused shift from cosine to sine function.

FIG. 4 also illustrates the DC error level of the toe-out factor $\phi_t/\omega_s$ as the steady state level upon which the sinusoids $t_{21}$ and $\hat{t}_{21}$ vary above the zero signal level. The time derivative of $t_{21}$, namely $\hat{t}_{21}$, eliminates the DC or steady state error level $\phi_t/\omega_s$ and, hence, this error signal is not passed through into rate ranging processor 32.

With further reference to FIG. 3, rate ranging processor 32 is shown in this embodiment to include a sine function generator 42 receiving a signal $\phi$ and producing at its output a signal of $\sin \phi$, and an amplifier 44 having a gain of $-d$ for transforming the output of function generator 42 into a signal of $-d \sin \phi$. A divider 46 divides the signal of $-d \sin \phi$ by the rate of change signal $\hat{t}_{21}$ from processor 32 producing a signal at the output of processor 32 of $$R = \frac{-d\sin \phi}{\hat{t}_{21}},$$

where $\hat{t}_{21}$ is substantially equal to $\dot{t}_{21}$ and $R$ is substantially equal to $R$. While the input signals of $\hat{t}_{21}$ and $\phi$ are time varying quantities, the output signal of $R$ is a steady state signal representing the range to the emitter, because the time varying aspects of these input signals cancel when divided in divider 46.

Figure 5A:
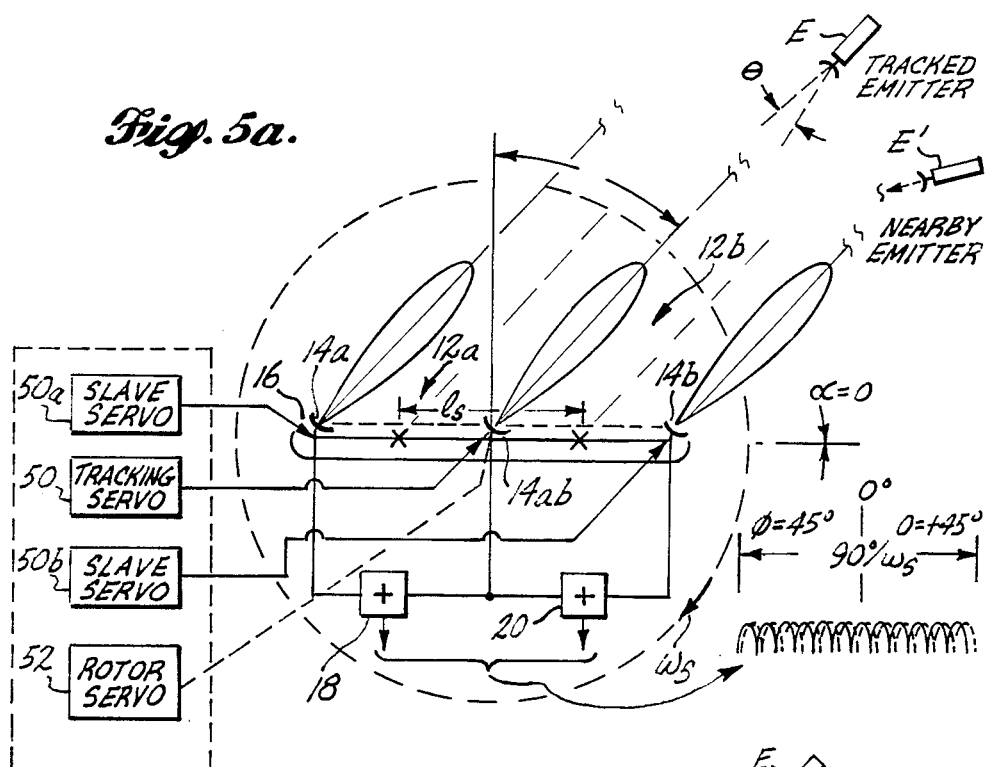
FIGS. 5a and 5b are plan views illustrating operation of the preferred platform mounting of the antenna elements that form the interferometers.
Figure 5B:
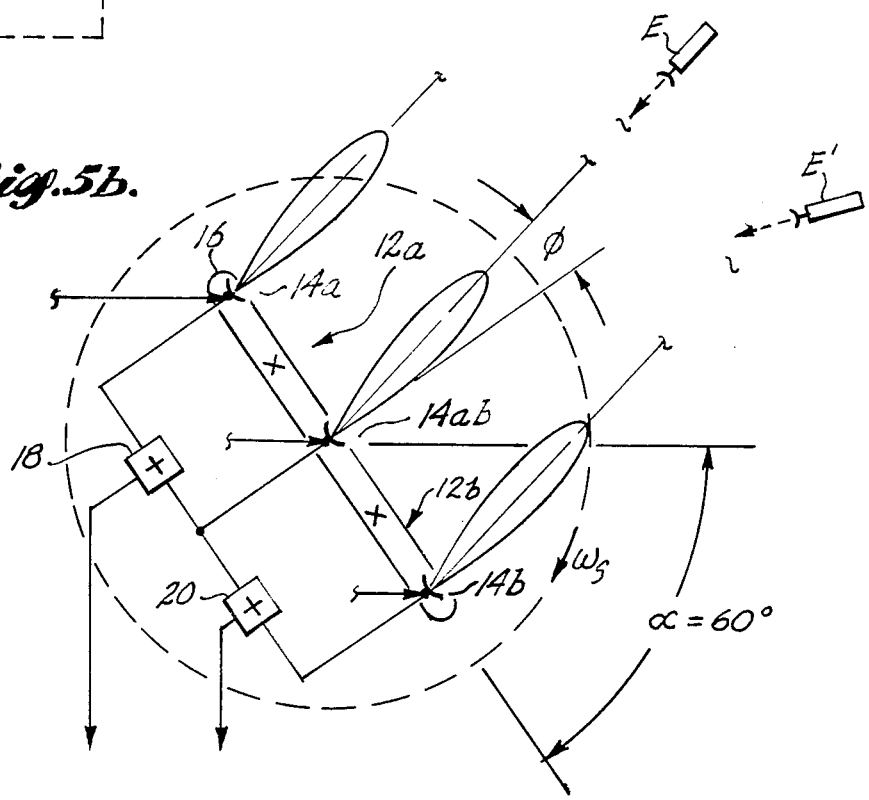

FIGS. 5a and 5b best illustrate one of the features of the preferred apparatus 10 of FIG. 1, in which the individual antenna elements 14a, 14ab and 14b are mounted for substantially independent servo controlled rotation on rotor 16 which may continuously rotate at $\omega_s$. For example, rotor 16 may carry other surveillance radar equipment which is continuously scanning in a 360° circle on the supporting aircraft or ship. In ranging on a distant emitter, it is desirable to maximize the strength of the signal received by the antenna elements and the interferometers 12a and 12b formed therefrom. By independently controlling the orientation of antenna elements 14a, 14ab and 14b by means of a tracking servo 50 and slave servos 50a and 50b coupled thereto, the beams of the individual antenna elements may be maintained parallel and pointing in the direction of the emitter during at least part of the cycle of rotation of rotor 16.

In applications where rotor 16 is continuously rotated at $\omega_s$ by rotor servo 52 and where a full 360° of rotation of the individual antenna elements relative to the rotor is not possible because of structural and/or other design constraints, then tracking servo 50 and servos 50a and 50b may cause these antenna elements to point at emitter E during part of the rotor cycle, such as from $\phi = -45°$ through $\phi = 0$ (i.e., broadside) to $\phi = +45°$ where $\phi$ is relative to the emitter E. Such an operation is indicated in FIGS. 5a and 5b. The waveform diagram shown in association with FIG. 5a indicates that strong, interferometer modulated emitter signals are obtained from the interferometers during the time that tracking servo 50 and slave servos 50a and 50b maintain the antenna elements pointed at the emitter through a portion of the rotor cycle corresponding to $\phi = -45°$ through $\phi = +45°$. In this embodiment, with the rotor rotation being at $\omega_s = 36°$ per second, the independent servo tracking of antenna elements 14a, 14ab and 14b on the emitter of interest, will extend the duration of the maximum signal strength to a period of approximately 2.5 seconds which is significantly greater than the peak signal duration that exists without independent tracking of the antenna elements. At all times during this independent servoing of the antenna elements 14a, 14ab and 14b, the beams of these antennas must be maintained parallel to each other in order to preserve the integrity of the interference patterns that form the basis of the rate ranging measurement.

Thus, it is convenient to use one of the antenna elements, such as center element 14ab as the master tracking element to which tracking servo 50 is coupled, and then slave the outboard elements 14a and 14b through slave servos 50a and 50b to the same angular orientation relative to rotor 16 as the master element 14ab. The foregoing independent servoing of the antenna elements is especially useful when tracking on an emitter E that is in the vicinity of one or more other nearby emitters E' which are not of interest. Existing tracking servo systems may be used and operated in a known manner so as to lock antenna element 14ab on the emitter of interest E. It is noted that with the very large range distances contemplated, that the parallelism of the antenna beams will not prevent each of the antenna elements from receiving a full strength signal since the beams will substantially overlap at the distant emitter.

While only a particular embodiment has been disclosed herein, it will be readily apparent to persons skilled in the art that numerous changes and modifications can be made thereto including the use of equivalent means, devices and method steps, without departing from the principles of the invention. For example, the ranging apparatus need not be carried on an aircraft or ship, and can be mounted on any mobile or stationary support if desired. The signal processing disclosed is not limited to any particular circuit implementation and may be constructed using analog circuitry, digital circuitry, programmed microprocessor or programmed general purpose computer systems. While the disclosed embodiment describes the invention as ranging on an emitter at a direct line of sight positioned relative to apparatus 10, the principles of the invention are also applicable to ranging on indirect, ground bounce emissions. Furthermore, the invention is not limited to ranging on emitters of any particular wavelength of electromagnetic radiation.

The embodiments of the invention in which an exclusive property or privilege is claimed are defined as follows:

1. An apparatus for determining the range of a source of electromagnetic emission from a monitoring location, comprising:

movable platform means;
first and second interferometer means mounted on said platform at a spacing d along a base line and having parallel receiving axes for receiving such source of emission;
means for moving said platform means so that said receiving axes scan at an angular rate $\omega_s$ relative to such source of emission and thereby produce interferometer signals having a relative time difference $t_{21}$;
angle of arrival means for sensing and producing a signal representing an angle of arrival $\phi$ of the source of emission relative to the base line of said first and second interferometer means;
time difference signal processing means for producing a signal $\dot{t}_{21}$ representing a rate of change of said time difference $t_{21}$; and
range signal processing means coupled to receive signals representing the angle of arrival $\phi$ and the rate of time difference change $\dot{t}_{21}$ to produce an output signal of range R as a function thereof in accordance with the relationship $$R = \frac{-d\sin\phi}{\dot{t}_{21}}.$$

2. The apparatus of claim 1, wherein said platform means is rotatably mounted and said means for moving said platform comprises means for rotating said platform at the angular rate $\omega_s$.

3. The apparatus of claim 1, wherein said first and second interferometer means comprises a common center antenna element and first and second outboard antenna elements arranged along said base line so that said first and second interferometer means are respectively formed between said center element and said first outboard element, and between said center element and said second outboard element.

4. The apparatus of claim 3, wherein said means for moving said platform comprises means for rotating said platform about an axis of rotation that extends substantially through said center antenna element.

5. The apparatus of claim 3, wherein said center and first and second outboard elements are mounted for rotatable tracking movement independent of the rotation of said platform means, and tracking servo means for controlling the orientation of said center and first and second outboard elements so as to track an emitter during movement of said platform means that causes said receiving axes of said first and second interferometer means to scan at the angular rate $\omega_s$.

6. The apparatus for determining the range of a source of electromagnetic emission from a monitoring location, comprising:
movable platform means;
first and second interferometer means mounted on said platform at a spacing d along a base line and having parallel receiving axes for receiving such source of emission;
means for moving said platform means so that said receiving axes scan at an angular rate $\omega_s$ relative to such source of emission and thereby produce interferometer signals having a relative time difference $t_{21}$;
angle of arrival detection means for sensing and producing a signal representing an angle of arrival $\phi$ of the source of emission relative to the base line of said first and second interferometer means; and
range signal processing means responsive to said interferometer signals having said relative time difference $t_{21}$ and including means for producing a signal $\dot{t}_{21}$, representing the rate of change of said relative time difference $t_{21}$, and further being responsive to said signal representing an angle of arrival $\phi$ to produce an output signal of range R as a function of said rate of change signal $\dot{t}_{21}$ of said relative time difference $t_{21}$ between said interferometer signals.

7. The apparatus of claim 6, wherein said platform means is rotatably mounted and said means for moving said platform comprises means for rotating said platform at the angular rate $\omega_s$.

8. The apparatus of claim 6, wherein said first and second interferometer means comprise a common center antenna element and first and second outboard antenna elements arranged along said base line so that said first and second interferometer means are respectively formed between said center element and said first outboard element, and between said center element and said second outboard element.

9. The apparatus of claim 8, wherein said means for moving said platform comprises means for rotating said platform about an axis of rotation that extends substantially through said center antenna element.

10. The apparatus of claim 8, wherein said center and first and second outboard elements are mounted for rotatable tracking movement independent of the rotation of said platform means, and tracking servo means for controlling the orientation of said center and first and second outboard elements so as to track an emitter during movement of said platform means that causes said receiving axes of said first and second interferometer means to scan at the angular rate $\omega_s$.

11. A method of ranging on a nonscanning emitter in which error in the resulting range signal output attributed to nonparallelism of receiving axes of scanning antennas is substantially eliminated, comprising the steps of:
rotating on a common, rigid platform, first and second interferometers mounted at a spacing d along a base line on said platform so that the interferometers exhibit substantially parallel receiving axes scanning across a source of electromagnetic emission at an angular scan rate $\omega_s$ so as to produce interferometer output signals representing the source of emission modulated by the scanning interferometers and having a relative time difference $t_{21}$;
measuring an angle of arrival $\phi$ of the source of emission with respect to the base line of said first and second interferometer means;
processing the output signals from the interferometers to produce a signal representing the time rate of change of said time difference $\dot{t}_{21}$; and
processing signals representing said angle of arrival $\phi$ and said signal $\dot{t}_{21}$ representing said rate of change of said time difference $t_{21}$ so as to produce an output signal of range R as a function thereof in accordance with the relationship of $$R = \frac{-d\sin\phi}{\dot{t}_{21}}.$$

* * * * *

UNITED STATES PATENT AND TRADEMARK OFFICE
CERTIFICATE OF CORRECTION

PATENT NO.   :   4,771,290
DATED        :   September 13, 1988
INVENTOR(S)  :   Moorfield Storey, Jr.

It is certified that error appears in the above-identified patent and that said Letters Patent is hereby corrected as shown below:

In the Abstract, line 18, "$\frac{-d\sin\phi}{t_{21}}$" should be -- $\frac{-d\sin\phi}{\dot{t}_{21}}$ --

Column 2, line 51, "$t_{21}$" should be --$\dot{t}_{21}$--

Column 3, line 59, "$t_{21} \simeq t_{21}$" should be -- $\hat{t}_{21} \simeq t_{21}$ --

Column 5, line 47, "$t_{21}$" should be -- $\dot{t}_{21}$ --
(Equation 8)

Column 6, line 55, "$t_{21}$" should be -- $\hat{t}_{21}$ --

Column 7, line 4, "$\dot{t}_{21}$" should be -- $\hat{t}_{21}$ --

Column 7, line 13, "$\hat{\dot{t}}_{21} \simeq \dot{t}_{21}$" should be -- $\hat{t}_{21} \simeq \dot{t}_{21}$ --

Column 7, line 16, "$t_{21}$" should be --$\hat{t}_{21}$ --

Column 7, line 35, "$\hat{\dot{t}}_{21}$" should be -- $\hat{\dot{t}}_{21}$ --

Column 7, line 41, "R" should be -- $\hat{R}$ --

Column 9, line 16, "$t_{21}$" should be -- $\dot{t}_{21}$ --
Claim 1, line 19

Column 9, line 20, "$t_{21}$" should be -- $\dot{t}_{21}$ --
Claim 1, line 23

Column 9, line 26, "$R = \frac{-d\sin\phi}{t_{21}}$" should be -- $R = \frac{-d\sin\phi}{\dot{t}_{21}}$ --
Claim 1, line 28

Column 9, line 33, "comprises" should be --comprise--
Claim 3, line 2

UNITED STATES PATENT AND TRADEMARK OFFICE
CERTIFICATE OF CORRECTION

PATENT NO. : 4,771,290
DATED : September 13, 1988
INVENTOR(S) : Moorfield Storey, Jr.

It is certified that error appears in the above-identified patent and that said Letters Patent is hereby corrected as shown below:

Column 7, line 23, "$t_{21}$", second occurrence, should be -- $\hat{t}_{21}$ --.

Column 10, line 66, "$R = \dfrac{-d\sin\phi}{t_{21}}$" should be -- $R = \dfrac{-d\sin\phi}{\dot{t}_{21}}$ --
Claim 11, line 29

Signed and Sealed this

Twenty-third Day of May, 1989

Attest:

DONALD J. QUIGG

Attesting Officer  Commissioner of Patents and Trademarks